(12) United States Patent
Brandt et al.

(10) Patent No.: US 11,155,502 B2
(45) Date of Patent: Oct. 26, 2021

(54) METHOD TO ADDITIVELY MANUFACTURE A FIBER-REINFORCED CERAMIC MATRIX COMPOSITE

(71) Applicant: Siemens Aktiengesellschaft, Munich (DE)

(72) Inventors: Milan Brandt, Melbourne (AU); Jens Dietrich, Falkensee (DE); Ingomar Kelbassa, Falkensee (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/472,866

(22) PCT Filed: Jan. 2, 2018

(86) PCT No.: PCT/EP2018/050012
§ 371 (c)(1),
(2) Date: Jun. 22, 2019

(87) PCT Pub. No.: WO2018/137894
PCT Pub. Date: Aug. 2, 2018

(65) Prior Publication Data
US 2020/0189143 A1 Jun. 18, 2020

(30) Foreign Application Priority Data
Jan. 25, 2017 (EP) .................... 17153083

(51) Int. Cl.
*C04B 35/83* (2006.01)
*C04B 35/628* (2006.01)
(Continued)

(52) U.S. Cl.
CPC .............. *C04B 35/83* (2013.01); *B28B 1/001* (2013.01); *B33Y 10/00* (2014.12); *B33Y 30/00* (2014.12);
(Continued)

(58) Field of Classification Search
CPC . B29C 64/153; B28B 1/001; C04B 35/62844; C04B 35/62847; C04B 35/62857
See application file for complete search history.

(56) References Cited

U.S. PATENT DOCUMENTS

2001/0051258 A1  12/2001  Hanzawa et al.
2005/0186878 A1  8/2005  Kostar et al.
(Continued)

FOREIGN PATENT DOCUMENTS

CN       1950192 A    4/2007
CN     105764634 A    7/2016
(Continued)

OTHER PUBLICATIONS

Liu Qi et al: "Effect of high-temperature preheating on the selective laser melting of yttria-stabilized zirconia ceramic", Journal of Materials Processing Technology, vol. 222, pp. 61-74, XP055389876, NL, ISSN: 0924-0136, DOI: 10.1016/j.jmatprotec.2015.02.036, abstract p. 74, col. 1, lines 2-6, 31-32; 2015.
(Continued)

*Primary Examiner* — Robert A Vetere

(57) ABSTRACT

A method of additively manufacturing a ceramic matrix composite material includes providing a ceramic fiber and a powdery base material for a ceramic matrix composite and layer-by-layer building up the ceramic matrix material for the ceramic matrix composite by irradiating of a powder bed formed by the base material with an energy beam according to a predetermined geometry, wherein the base material is melted, solidified and adhesively joined to the ceramic fiber in that parameters of the energy beam are locally chosen such that in the contact region of the ceramic fiber and the powder bed, the ceramic fiber is only partly melted.

16 Claims, 2 Drawing Sheets

(51) Int. Cl.
    *C04B 35/657*     (2006.01)
    *C04B 35/117*     (2006.01)
    *C04B 35/185*     (2006.01)
    *B33Y 10/00*     (2015.01)
    *B33Y 30/00*     (2015.01)
    *B33Y 80/00*     (2015.01)
    *B28B 1/00*     (2006.01)
    *C04B 35/488*     (2006.01)
    *C04B 35/565*     (2006.01)
    *C04B 35/80*     (2006.01)

(52) U.S. Cl.
    CPC ............ *B33Y 80/00* (2014.12); *C04B 35/117* (2013.01); *C04B 35/185* (2013.01); *C04B 35/488* (2013.01); *C04B 35/565* (2013.01); *C04B 35/62852* (2013.01); *C04B 35/62857* (2013.01); *C04B 35/62863* (2013.01); *C04B 35/62873* (2013.01); *C04B 35/657* (2013.01); *C04B 35/80* (2013.01); *C04B 2235/3217* (2013.01); *C04B 2235/3244* (2013.01); *C04B 2235/3463* (2013.01); *C04B 2235/3826* (2013.01); *C04B 2235/428* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/6026* (2013.01); *C04B 2235/616* (2013.01); *C04B 2235/667* (2013.01)

(56) References Cited

U.S. PATENT DOCUMENTS

| | | |
|---|---|---|
| 2007/0051455 A1 | 3/2007 | Franchet et al. |
| 2011/0106290 A1 | 5/2011 | Hövel et al. |
| 2015/0251247 A1 | 9/2015 | Monsheimer et al. |
| 2015/0375340 A1* | 12/2015 | Cui ...................... B22F 3/1055 |
| | | 428/188 |
| 2016/0175929 A1 | 6/2016 | Colin et al. |
| 2018/0056435 A1* | 3/2018 | Ladani .............. H01L 23/53276 |
| 2018/0362412 A1 | 12/2018 | Morris |

FOREIGN PATENT DOCUMENTS

| | | |
|---|---|---|
| CN | 106164018 A | 11/2016 |
| CN | 107098714 A | 8/2017 |
| EP | 2581356 A1 | 4/2013 |
| EP | 2601006 B1 | 6/2014 |
| EP | 2962789 A2 | 1/2016 |
| JP | H06306407 A | 11/1994 |
| JP | 2000211977 A | 8/2000 |
| JP | 2005239539 A | 9/2005 |
| JP | 2006328538 A | 12/2006 |

OTHER PUBLICATIONS

Hagedorn Y-C et al: "SLM of Net-Shaped High Strength Ceramics: New Opportunities for Producing Dental Restorations", 22nd Annual International Solid Freeform Fabrication Symposium—An Additive Manufacturing Conference, pp. 536-546, XP055389930, abstract p. 537, lines 17-21, p. 543, figure 9a; 2011.

PCT International Search Report and Written Opinion of the International Searching Authority dated Apr. 10, 2018 corresponding t PCT International Application No. PCT/EP2018/050012 filed Jan. 2, 2018.

* cited by examiner

METHOD TO ADDITIVELY MANUFACTURE A FIBER-REINFORCED CERAMIC MATRIX COMPOSITE

CROSS REFERENCE TO RELATED APPLICATIONS

This application is the US National Stage of International Application No. PCT/EP2018/050012 filed Jan. 2, 2018, and claims the benefit thereof. The International Application claims the benefit of European Application No. EP17153083 filed Jan. 25, 2017. All of the applications are incorporated by reference herein in their entirety.

FIELD OF INVENTION

The present invention relates to the additive manufacture of a ceramic matrix composite material, such as a fiber-reinforced material or, as the case may be, a component made thereof. Further, an apparatus and an according component are described.

Preferably, the component denotes a component applied in a turbo machine, e.g. in the hot gas flow path hardware of a gas turbine. The component is, thus, advantageously made of a superalloy or nickel-based alloy, particularly a precipitation hardened alloy.

BACKGROUND OF INVENTION

Additive manufacturing techniques comprise e.g. powder bed methods, such as selective laser melting (SLM), selective laser sintering (SLS) or electron beam melting (EBM), as well as blown powder methods, such as laser metal deposition (LMD).

A method of selective laser melting is described in EP 2 601 006 B1, for example.

Additive manufacturing methods have proven to be promising in the fabrication of prototypes or complex and filigree components, such as lightweight design or cooling components comprising mazelike internal structures. Further, additive manufacture stands out for its short chain of process steps, as a manufacturing step can be carried out directly based on corresponding CAD/CAM and/or design data.

A problem to be solved or task to be complied within the context of additive manufacturing is to find a reproducible, feasible, and appropriate manufacturing route also in combination with maintenance, repair and overhaul applications of fiber-reinforced ceramic composite materials or ceramic matrix composites (CMCs).

CMCs—such as SiC—SiC or Oxide-Oxide material systems, particularly $Al_2O_3$ fibers in a $Al_2O_3$ matrix or different material combinations are a promising candidate for the production of damage tolerant short and long fiber-strengthened components, e.g. for the harsh environment of the hot gas path in gas turbines. A drawback to overcome in this context is particularly that the melting point of both materials of the same sort—i.e. matrix powder on the one side and a solid fiber on the other side—is approximately the same.

When the mentioned drawbacks can be solved, additive manufacturing routes are expected to provide the opportunity of exploiting the design freedom of additive manufacturing, e.g. of internal hollow structures, such as specifically designed cooling channels for materials ceramic materials, in order to increase the gas turbine efficiency by an increase in the turbine inlet temperature and/or, a decrease in cooling air consumption.

Up to now, there is no reproducible and reliable manufacturing route, except the "conventional" approaches which produce fibers/fabrics and a usually comprise a subsequent lamination or sintering step including post-infiltration.

SUMMARY OF INVENTION

By the present invention, an approach is provided for the additive, e.g. as powder bed based, buildup of CMC's based on the known additive manufacturing routes, such as SLM, LMD or EBM or a combination thereof.

It is an object of the present invention to provide means which help to overcome the mentioned problems or drawbacks.

The mentioned object is achieved by the subject-matters of the independent claims. Advantageous embodiments are subject-matter of the dependent claims.

An aspect of the present invention relates to a method of additively manufacturing a ceramic matrix composite material or component comprising providing a ceramic fiber and a powdery, and expediently ceramic, base material for the ceramic matrix composite.

The method further comprises layer-by-layer building up or manufacturing the ceramic matrix material (base material) for the ceramic matrix composite by irradiating of a powder bed formed by the base material with an energy beam according to the desired and predetermined geometry of the component, wherein the base material is melted, solidified and thereby adhesively joined to the ceramic fiber. This is carried out in that (irradiating) parameters of the energy beam are advantageously locally chosen such that, in a contact region of the ceramic fiber and the powder bed, the ceramic fiber is only partly melted, and advantageously not completely melted. By the solely partial melting procedure, it is expediently achieved, that the ceramic fiber is not destroyed but its material is still intact and, at the same time adhesively joined to the solidified matrix material. In other words, the present invention pertains to the control of the irradiation process, such that the ceramic fiber can indeed be adhesively joined without losing its outstanding properties for the final CMC.

For a gas turbine technology, it is of course highly desirable, that the additive manufacturing capabilities can be transferred to ceramics with their known high temperature durability, as described.

In an embodiment the fiber is pre-positioned or pre-sited in the buildup space for the additive manufacture, prior to the irradiation or buildup. Said pre-positioning-placement may e.g. be carried out by any means known to a skilled person.

In an embodiment the fiber is brought or placed in the powder bed, particularly in the previously deposited layer of said powder bed, during the additive manufacture by a movable equipment or apparatus. This embodiment is advantageous, as it may allow for the exploitation of a greater design freedom during the additive manufacture. Said apparatus is, advantageously, movable independently from any further device hardware, such as an irradiation or scanning equipment. Said apparatus shall, advantageously, further be embodied in a very compact way, e.g. with outer extensions of only a few millimeters- or centimeters, such that any placement allows a lot of design freedom with regard to in-situ fiber placement in a layer of powdery base material along with an irradiation solidification step.

A further aspect of the present invention relates to an apparatus for the additive manufacture as described, wherein said apparatus is configured for the placement of the fiber into the powder bed, and wherein the apparatus is further independently movable from any other device hardware, such as an irradiation apparatus.

In an embodiment, a thickness of the fiber, or in case of a filament fiber, a diameter of the fiber, amounts to more than half of the layer thickness of the base material for the layer-by-layer buildup. By means of this embodiment, it may be favorable to choose the irradiation parameters that the fiber is not completely melted during the irradiation step. If, on the other side, a thickness or diameter of the fiber is chosen even smaller as compared to the layer thickness, it is likely that the fiber will also melt during the irradiation.

In an embodiment the fiber has a filament or filament-like shape. This is an advantageous embodiment.

In an embodiment, the fiber has a layer- or sheet-like shape.

In an embodiment a diameter, such as an average diameter, of particles of the base material is smaller than a thickness or diameter of the fiber.

In an embodiment an average in diameter of the particles of the base material is at least two times smaller than a thickness of the fiber.

In an embodiment, an, e.g. average diameter of particles of the base material is five to ten times smaller than a thickness or diameter of the fiber.

By means of these embodiments, it may be achieved that—even though the materials of the fiber and the base material (matrix material) are similar or the same—the material of the fiber may not be harmed during irradiation, but only particles may be melted due to size-dependent or melting point reductions. It is known, that a decrease of a spatial dimension of material below a defined threshold can reduce its melting point.

In an embodiment, a mode of the irradiation with the energy beam at a transition from a powder bed region, e.g. a layer region observed in plan view on the powder bed, into the contact region is changed such that the material of the fiber is only partly melted, instead of being melted completely as is usually the case in the solidification of the base material.

In an embodiment, in the powder bed region, the irradiation with the energy beam is carried out in a continuous wave mode.

In an embodiment, in the contact region, the irradiation with the energy beam is carried out in a pulsed mode, such as a tailored pulse mode.

In an embodiment, the irradiation with the energy beam is carried out, wherein at least one of the irradiation parameters chosen from power, power density, frequency, pulse duration, repetition rate and pulse shape are adapted, particularly adapted to the desired or predetermined heat input according to the present invention. For example, the power density may be reduced in that a pulse shape, e.g. chosen from sine wave, triangular, square of further shapes is chosen for the irradiation of the contact region.

In an embodiment, the power or power density of the energy beam is reduced at a transition from the powder bed region to the contact region, advantageously such that—due to said reduction—the fiber is not completely melted, as compared to the base material for the ceramic matrix.

In an embodiment, the fiber has a filament shape and a diameter of the fiber is increased prior to the layer-by-layer buildup by a, e.g. oxidic coating, and wherein the respective coating material is melted, evaporated and/or sacrificed during the irradiation.

In an embodiment, the fiber and the base material made of or comprise similar ceramic materials, such as the material systems C/C, SiC/SiC, $Al_2O_3/Al_2O_3$, $ZrO_2/ZrO_2$ or mullite/mullite.

In an embodiment, the fiber and the base material are made of or comprise dissimilar ceramic materials, such as the material systems C/SiC, $Al_2O_3/ZrO_2$.

In an embodiment, the powder bed is preheated to temperatures of above 1500° C., particularly above 2000° C., for the prevention of rupture and/or stresses, e.g. by means of a laser, such as a $CO_2$- or Nd:YAG-laser, an electron beam, or inductive heating means.

In an embodiment, the ceramic matrix composite is not structurally (thermally) post-processed, such as by hot isostatic pressing and/or post-infiltration after the layer-by-layer build-up.

A further aspect of the present invention relates to a component which is or can be manufactured by the method as described.

In an embodiment, the component or its material for the component further comprises a density of 95% or more, such as 98% or more. In other words, the component or its material advantageously comprises a plurality of less than 5%, advantageously less than 2%. Said percentages may advantageously pertain to volume percentages.

In an embodiment, the component comprises a material with a bending strength of more than 800 MPa, advantageously of more than 1000 MPa or even of more than 1100 MPa.

In an embodiment, the material comprises a material with a mean surface roughness of less than 100 μm, advantageously of less than 70 μm. Said roughness may alternatively relate to a depth of roughness or roughness depth, or a mean or square roughness or average surface finish.

Aspects, embodiments or advantages described herein relating to the described method and/or the described material or component may as well pertain to the described apparatus and vice versa.

Further features, expediencies and advantageous refinements become apparent from the following description of the exemplary embodiment in connection with the Figures.

DETAILED DESCRIPTION OF INVENTION

Figure 1:
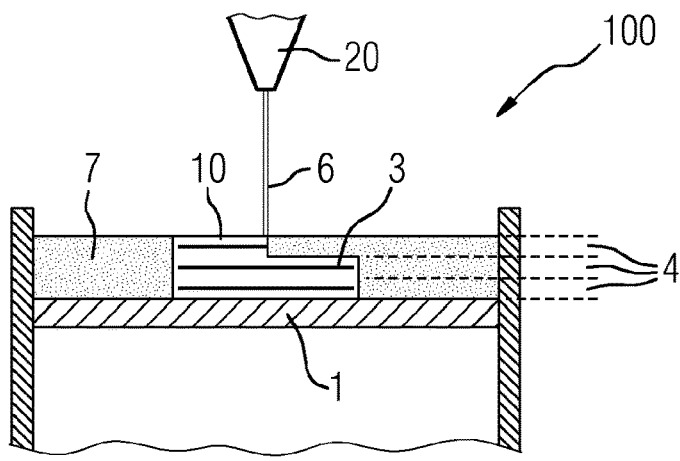
FIG. 1 shows a schematic sectional view of a component during its additive manufacture.

Like elements, elements of the same kind and identically acting elements may be provided with the same reference numerals in the Figures.

FIG. 1 indicates schematically a powder bed process for additively manufacturing a component 10. The process may be carried out in an additive manufacturing device 100. The process may further relate to selective laser melting, selective laser sintering and/or electron beam melting, for example.

The component is, advantageously, a turbo machine component, particularly applied in the flow path hardware of gas turbines.

It is commonly known in SLM processes that the component 10 is manufactured on top of a substrate or build platform 1. Particularly, the first layer to be manufactured of a metal component is adhesively joined or metallurgically bonded to the substrate 1. The component 10 may be depicted in a partially manufactured state. The component 10 is further built layer-by-layer out of the powder bed formed by a powdery base material 2. After the feeding of a layer of the base material 2 by a scraper or any other deposition equipment (not explicitly indicated), the respective layers are, advantageously, irradiated by an energy beam provided by an irradiation device 20. The energy beam 6 may be a laser beam. Alternatively, the energy beam may be an electron beam and accordingly, the irradiation device an electron beam source.

Due to the irradiation, the base material 2 of the as-deposited layer (cf. reference numeral 4) is melted and subsequently solidified. The layer thickness may be determined by said scraper that moves, e.g. automatically, over the powder bed and removes excess material (not explicitly indicated). Typical layer thicknesses amount to 20 μm or 40 μm. During the manufacture, said laser or energy beam 6 scans over the surface of the powder bed and melts the powder particularly on selected areas which correspond to a desired geometry of the component 10. Said geometry may be predetermined by a corresponding CAM- and/or CAD-file.

The component 10 is, according to the powder bed process, buildup (layer-by-layer) in a build space BS along to a build direction Z (vertical direction).

The process of selective laser melting is predominantly applied in the manufacture of metal components. However, it has already been proven, that the powder bed based selective melting of ceramic materials is also possible, even with a comparably lower porosity of the final material.

The present invention focuses on the additive manufacture of ceramic materials and/or ceramic matrix composites (CMCs), such as fiber-reinforced materials for gas turbine components, as mentioned above.

In single layers (cf. numeral 4) of the component 10, as shown in FIG. 1, a ceramic fiber 3 is indicated. According to this embodiment, the base material 2 is expediently a ceramic (matrix) base material for the final CMC component.

According to the present invention, the ceramic fiber 3 is advantageously placed or arranged in the final component such that a longitudinal axis of the fiber is at least partly or proportionately arranged along a direction of expectedly highest mechanical load, such as parallel to or along the exertion of centrifugal forces applied to the component e.g. in an operation of the turbine, e.g. in case of rotor components. Said longitudinal axis of the fiber is, thus, advantageously arranged parallel to the XY-plane (cf. FIGS. 4 to 6), i.e. parallel to a powder bed surface.

It is noted here, that shrinkage of the material as a consequence of the melting/sintering of the base material is neglected in the Figures.

For materials of a matrix 5 (cf. FIGS. 2 and 3), which may represent the solidified base material, and the fiber 3, the following material systems come presently into consideration, wherein a nomenclature of X/Y denotes a X-fiber reinforcing a matrix of material Y.

Thus, for similar material systems, the following materials may e.g. be applied: C/C, SiC/SiC, $Al_2O_3/Al_2O_3$, $ZrO_2/ZrO_2$ or mullite/mullite.

For dissimilar materials, the systems C/SiC, $Al_2O_3/ZrO_2$ may e.g. be applied.

The list of materials is not exclusive and any combinations known to a skilled person may come into consideration according to the present invention.

Figure 2:
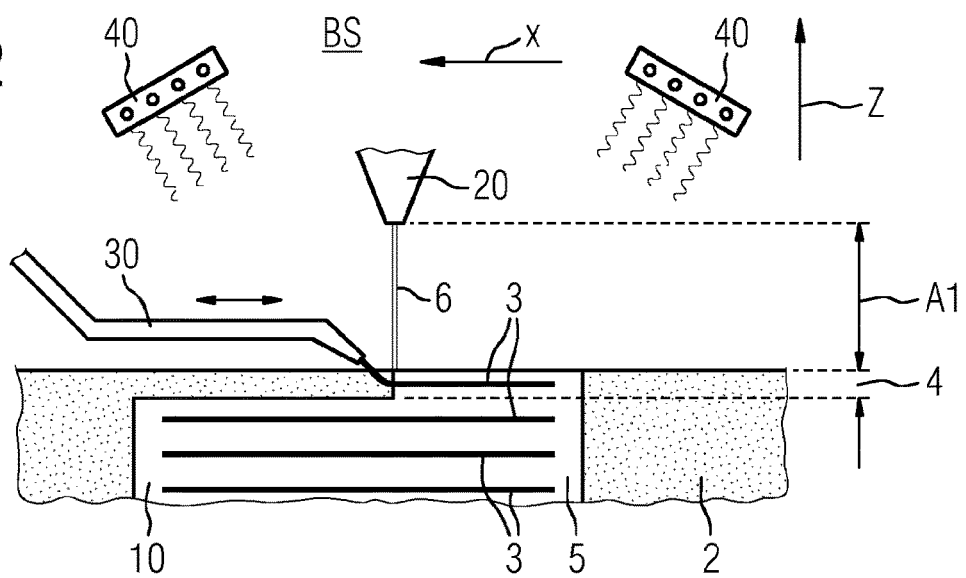
FIG. 2 shows a schematic side or sectional view of ceramic matrix composite material being manufactured by the described method.
Figure 3:
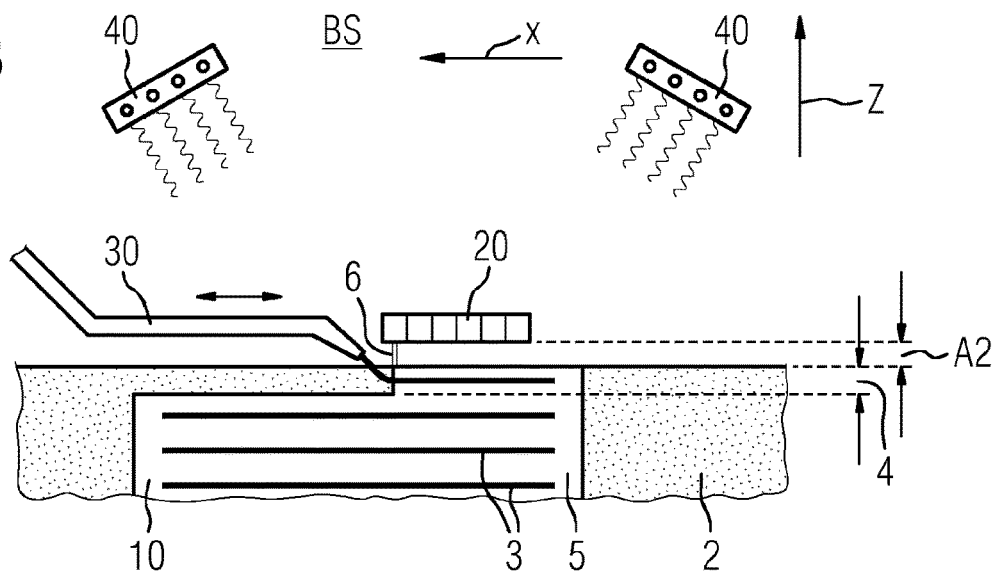
FIG. 3 shows a schematic side of sectional view of the component according to FIG. 2 in an alternative embodiment of the manufacturing hardware.

FIGS. 2 and 3 describe the presented method in more detail, as compared to FIG. 1.

In contrast to FIG. 1, FIG. 2 illustrates in more detail the method of additively manufacturing the CMC described herein. Particularly, it is illustrated how the fiber is brought into the powder bed and finally joined to or with the matrix 5.

The mentioned method comprises providing a ceramic fiber 3 and the powdery base material 2 as described, wherein said fiber 3 and the base material 2 shall be joined to the CMC in an additive process, wherein, however, the fiber 3 is not necessarily manufactured by additive means.

The method further comprises layer-by-layer building up the ceramic matrix material 5 for the CMC by irradiating of a powder bed formed by the base material 2 with an energy beam 6 according to a predetermined and desired geometry of the component 10, wherein the base material 2 is melted, solidified and adhesively joined to the ceramic fiber 3 in that parameters of the energy beam 6 are locally chosen such that in a contact region CR of the ceramic fiber 3 and the powder bed, the ceramic fiber 3 is only partly melted.

It seems that it is so far not possible to manufacture ceramic fibers for CMCs additively, at least not with the mechanical properties required for gas turbine applications. However, it is within the scope of the present invention, that also the fiber 3 may be manufactured by additive means and at the same time joined to the matrix 5.

The method makes use of an apparatus or equipment 30 being suitable for placing on bringing the fiber into the powder bed for the manufacture of the CMC-component 10. Particularly, said apparatus 30 for the additive manufacture, is independently movable from further device gadgets, such as the irradiation apparatus 20. The irradiation apparatus 20 as depicted in FIGS. 1 and 2 is, advantageously, located remote from a manufacturing surface or powder bed surface by the distance A1 along the buildup direction Z, as shown in FIG. 2. Distance A1 may amount to 200 to 300 mm, for example. As shown in FIG. 2, the apparatus 30 is illustrated as a fairly filigree and thin tool, in which the fiber 3 for the CMC may be guided and/or conveyed into the powder bed. At the same time, it is desired, that the apparatus 30 does not interfere with the irradiation device 20 or the corresponding energy beam 6.

Preferably, the apparatus 30 can be controlled and moved independently from the build platform 1 as well as from said irradiation device or apparatus 20 and the energy beam 6. The energy beam 6 may for example be guided such that it is tracked by the apparatus 30 or vice versa. This allows for an expedient placement of the fiber 30—advantageously in each layer to be manufactured—and reliable "integration" of the fiber 3 in(to) the matrix material 5 in order to form the CMC.

By means of the arrow X in FIG. 2 pointing to the left, it is indicated that the irradiation device 20 and/or only the respective energy beam 6 may be guided from right to left for irradiating and, thus, solidifying the powder bed according to the corresponding vector or trajectory. During this movement in x-direction, the apparatus 30 or its placement tip (not explicitly indicated) may e.g. be moved or tracked in order to place the fiber 3 in the powder bed 2.

The apparatus 30 may be or comprise a wire feeding apparatus, with which the fiber 3 is inserted into the powder bed 2.

The apparatus 30 may further be or comprise a nozzle, with which the fiber 3 is inserted or placed accordingly.

Deviating from the indication of FIG. 2, the apparatus 30 may be arranged close to the irradiation device 20 or even coaxially with respect to the irradiation device.

Still further, the apparatus 30 may be integrated into a scraper or coating apparatus as mentioned above. According to this embodiment, the apparatus 30 may be constituted by or comprise a plurality of feeders or weavers, such as a weaving system, with which the fiber could be composed and/or placed in the powder bed 2.

Further, it is shown in FIG. 2 that the overall additive manufacturing device 100 may be equipped with heating means 40 which are only schematically indicated.

With this heating "tools" the ceramic powder bed may be preheated to temperatures of above 1500° C. for instance. Preferably said means are capable of heating or preheating the powdery base material 2 to temperatures of above 2000° C. This is particularly desired and/or expedient for the prevention of rupture and/or stresses in the final CMC.

Said heating means 40 may be constituted by an energy beam or a 1 μm- or 10 μm wavelength $CO_2$-laser for example. Said laser may be of comparable high power and, possibly, comprise a defocused or widened laser spot in order to homogeneously heat the base material of the powder bed. The mentioned heating may pertain to a pre-heating i.e. a heating prior to the actual irradiation by the energy beam 6 or to a heating process in line with the additive buildup of the CMC. Alternatively, the heating means 40 may be constituted by any other type of expedient laser, such as Nd:YAG-laser, or even by inductive heating means. When applying inductive heating means for preheating, it may be necessary to provide a coil arrangement around the whole powder bed.

FIG. 3 shows an alternative embodiment of the irradiation device 20 as compared to FIG. 2. In contrast, the irradiation device may be provided or constituted by a bar of laser or laser diodes for irradiating and solidifying the base material 2. Said bar is only schematically indicated. The double arrow above the bar 20 may indicate, that the respective bar is expediently movable over the powder bed in X- and Y-direction (lateral direction parallel to the surface of the powder bed). In contrast to the irradiation apparatus as shown in FIG. 2, the bar apparatus 20 is, advantageously, guided or guidable over the powder bed at a very close distance A2 being significantly smaller than the mentioned distance A1. The distance A2 may amount to 1 or 3 mm only. Even such a small distance may allow for a reliable and expedient placement of the fiber 3 by an accordingly configured placement apparatus 30, as described above.

The fiber 3 as described herein may be a filament-type fiber or any other fiber, such as a layer-type fiber.

As an alternative to the described placement apparatus 30 as shown in FIGS. 1 and 2, the present invention may as well be carried out in that the fiber 3 is pre-positioned or pre-sited in the build space BS in which also the component 10 is to be manufactured. For example, the fiber 3 may be clamped or spanned in the build space BS in such a way that it is, later on, be properly arranged in the solidified matrix layer.

Figure 4:
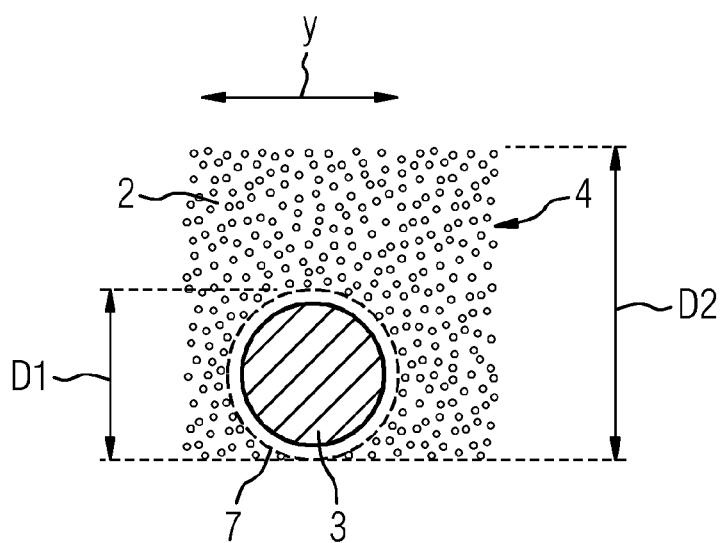
FIG. 4 shows a schematic section of a ceramic fiber arranged in a bed of powdery base material.

FIG. 4 indicates a cross-section or filament-type fiber 3 or as the case may be a fiber wire, arranged in a powder bed of base material 2 as described. Preferably, only a thickness D2 of a single layer 4 is shown. The fiber 3 has a thickness or diameter D1 which amounts roughly to half of the layer thickness D2. As the typical layer thicknesses in the SLM processes amount to 20 to 40 μm, a diameter or thickness D1 of the fiber may amount to 10 to 20 μm, such as 13 μm, for example. The diameter D1 of the fiber may as well amount to 100 μm or even more.

This size relationship may, particularly, be advantageous, as it may allow for an expedient strengthening or reinforcement of the CMC by means of the fiber, if the component 10 is manufactured by a plurality of layers of the described embodiments. At the same time, it may—by way of a variation of the irradiation parameters—be achieved that the fiber 3 is not completely melted or damaged when exposed to the energy beam 6 during irradiation.

The thickness D1 may as well amount to less than half of the thickness D2. Preferably, however, the thickness or diameter D1 amounts to more than half of the thickness D2.

Single base material particles are also schematically illustrated in FIG. 4. These particles surround the fiber 3 in the powder bed layer. In contrast to the indication of FIG. 4, the fiber may as well be arranged or centered in the layer 4. A diameter of particles of the base material 2 is smaller, advantageously, two to ten times, more advantageously five to ten times, smaller than a thickness D1 of the fiber 3. By this means, it may be achieved that the particles melt anyway at lower temperatures than the fiber 3 does during irradiation with a laser beam 6 according to a normal irradiation mode. This may be due to a "size-effect" which let the melting point of the powder particles decrease as compared to the fiber 3 even if the materials of fiber and base material are the same.

Further, it is shown in FIG. 4 that the fiber 3 is coated (cf. dashed surrounding of the fiber) with a coating of coating material 7. This coating may be of any ceramic or bonding agent material by means of which an adhesive joined between the fiber and the matrix may finally be achieved. Preferably, the coating may be an oxidic coating. Further, advantageously, the coating is being melted during the irradiation with a laser beam. By this means, the mentioned joint may be facilitated. Additionally or alternatively, the coating 7 may be of any material, which is or may be sacrificed or evaporated during irradiation.

Figure 5:
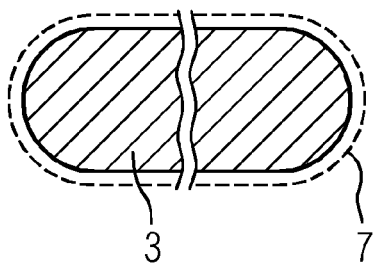
FIG. 5 shows a layered fiber and a corresponding coating in an embodiment alternative to the fiber shown in FIG. 4.

FIG. 5 shows an alternative embodiment of the fiber 3 in cross section, particularly a fiber with an elliptic or layer-by-layer shape. Such a fiber embodiment is, particularly, advantageous when the fiber is anyway expected to be pre-placed in the build space, as such a fiber may hardly be adhesively joined (as a whole) to the matrix material during irradiation.

Figure 6:
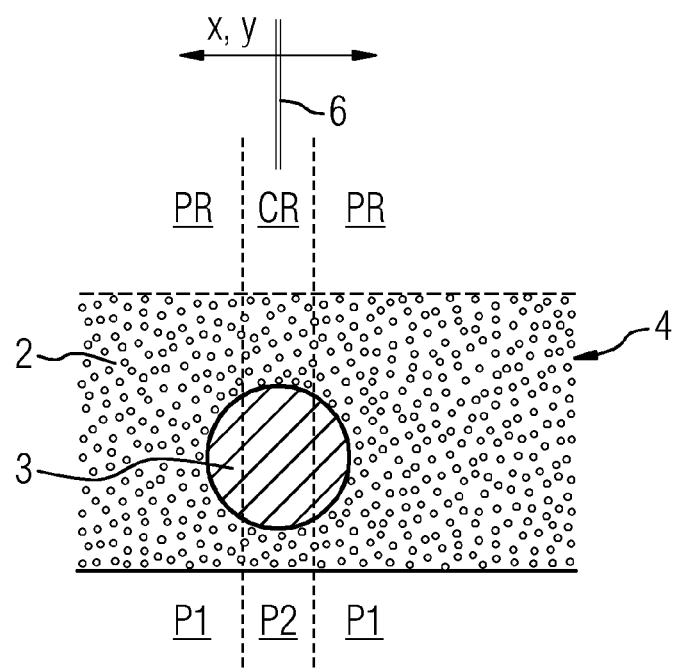
FIG. 6 shows a section of the fiber arranged in a layer of a powder bed, wherein the fiber is being irradiated by an irradiation apparatus or system 20.

FIG. 6 further illustrates the process of in situ forming the CMC by adhesively joining the described fiber to the mentioned matrix 5 by additive means, as already described partly by means of FIGS. 2 and 3.

Similar to FIG. 4, FIG. 6 shows a cross-section of the fiber being arranged in the powder bed of base material 2. Preferably, again only a single layer 4 is shown representatively. The fiber 3 is arranged roughly in the middle of said layer.

A mode of irradiation may be illustrated following:

The energy beam 6 may e.g. be guided laterally, so parallel to the powder bed, e.g. in X- or Y-direction (cf. arrow in upper part of FIG. 6) over a powder bed region, i.e. a region in the layer of base material 2, where no fiber is arranged, towards a contact region CR, in which—e.g. observed in plan view onto the powder bed—the respective fiber 3 is arranged. The parallel vertical dashed lines in FIG. 6 define exemplary limits of the described contact region CR. Accordingly, said contact region CR may deviate from the actual physical dimension of the fiber 3, as shown.

At or originating from a transition from the powder bed region PR, i.e. a layer region observed in plan view on the powder bed, into the contact region CR, the irradiation mode may for example be changed such that the mechanical properties of the fiber are not destroyed by the thermal impact, for example when the fiber is completely melted by the energy beam.

There are many ways to facilitate the switch of the irradiation mode as described. For example, the easiest way may be to decrease the laser power if the fiber is prone to get melted when the laser beam passes by. For example, if the melting point of the base material particles and the fiber are the same, such a decrease in the irradiation power may be advantageous.

Preferably, the irradiation mode may be switched from a continuous irradiation to a pulsed irradiation when passing from the powder bed region PR to the contact region CR. This is indicated in FIG. 6 in that a laser power P1, being greater than a laser power P2, is indicated in the powder bed region PR.

Thus, in the powder bed region PR, the irradiation is expediently carried out in a continuous wave mode and, in the contact region CR, the irradiation is expediently carried out in a pulsed mode, such as a tailored pulse mode, wherein e.g. irradiation parameters chosen from power, power density, frequency, pulse duration, repetition rate and pulse shape are adapted according to the desired melting result, i.e. a situation, wherein the fiber 3 is expediently bonded to the solidified powder or base material 2 in that the fiber 3 is (only) partly melted. In other words, in the contact region, where the fiber 3 is arranged, the energy, power or power density of the energy beam is well dosed or charged very accurately, expediently reduced (as compared to an irradiation in the powder bed region PR), in order to allow for an expedient bonding or adhesion of the fiber 3, as described.

According to the present invention, it is provisioned that the readily or as-manufactured ceramic matrix composite material is not structurally or thermally post-processed, such as by hot isostatic pressing and/or post-infiltration steps e.g. after or during the layer-by-layer buildup or manufacture. Thereby, a significant and advantageous reduction in the gross manufacturing time may be provided.

Along with the presented method, of course the readily manufactured component can be provided with revolutionized or novel mechanical or thermo-mechanical properties.

For example, the component 10 may—manufactured by the method as described—be awarded with a relative density of 98% or even more. In other words, the material of said component may be readily manufactured to comprise a porosity of less than 5%, advantageously less than 2%.

Moreover, said material may be manufactured with a bending strength of more than 1000 Megapascal (MPa), advantageously more than 1100 MPa.

Still further, said material may be manufactured with a mean surface roughness of its internal as well as external surfaces of less than 100 µm, advantageously of less than 80 µm or even less, such as 70 µm or less.

A large surface roughness of course constitutes a major drawback, particularly when internal surface of complex ore at least partly hollow components are concerned. This is because the surface of internal passageways can normally not be post-processed, as in the case of state-of-the-art selective laser melting process. Thus, a method which inherently provides a ceramic matrix composite material with a favorable surface roughness in the given ranges simultaneously provides the material with far superior oscillatory of fluidic properties. The mentioned aspects are particularly important, when the component is pervaded by cooling channels or the like, as in the case of turbine blades.

Actually, it is advantageous that the fibers 3 are firstly oriented in the buildup (or vice versa), such that the final component is optimized according to the expected mechanical or thermo-mechanical loads, i.e. that the component may e.g. absorb or resist to extra high stress. In other words, the fiber may—in each layer—be arranged relative to the matrix or base material, such that an optimal mechanical resistivity of the component may be achieved in view of the final application. For example, in case of turbine blade or vane components, the fibers may advantageously be arranged along a longitudinal direction of said blade.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of additively manufacturing a ceramic matrix composite comprising:
   providing a ceramic fiber and a powdery base material for the ceramic matrix composite,
   layer-by-layer building up ceramic matrix material for the ceramic matrix composite by irradiating a powder bed formed by the base material with an energy beam according to a predetermined geometry, wherein the base material is melted, solidified and adhesively joined to the ceramic fiber within each layer of the ceramic matrix composite in that parameters of the energy beam are locally chosen such that in a contact region of the ceramic fiber and the powder bed within each layer of the ceramic matrix composite, the ceramic fiber is only partly melted.

2. The method according to claim 1,
   wherein the fiber is pre-positioned in a build space for the additive manufacture prior to the irradiation.

3. The method according to claim 1,
   wherein the fiber is placed in the powder bed during the additive manufacture by a movable apparatus.

4. The method according to claim 1,
   wherein a thickness of the fiber amounts to more than half of a layer thickness of the base material for the layer-by-layer build-up.

5. The method according to claim 1,
   wherein a diameter of particles of the base material is five to ten times smaller than a thickness of the fiber.

6. The method according to claim 1,
   wherein a mode of the irradiation with the energy beam at a transition from a powder bed region, into the contact region is changed such that the material of the fiber is only partly melted.

7. The method according to claim 6,
   wherein, in the powder bed region, the irradiation with the energy beam is carried out in a continuous wave mode and, in the contact region, the irradiation with the energy beam is carried out in a pulsed mode,
   wherein at least one of the parameters of the energy beam chosen from power, pulse duration, repetition rate and pulse shape are adapted.

8. The method according to claim 6,
wherein a power or power density of the energy beam is reduced at the transition from the powder bed region to the contact region.

9. The method according to claim 1,
wherein the fiber has a filament shape and a diameter of the fiber is increased prior to the layer-by-layer buildup by a coating, and
wherein material of the coating is melted during the irradiation.

10. The method according to claim 9,
wherein the fiber has the filament shape and the diameter of the fiber is increased prior to the layer-by-layer buildup by oxidic coating, and
wherein the respective coating material is melted during the irradiation.

11. The method according to claim 1,
wherein the fiber and the base material are made of or comprise similar ceramic materials.

12. The method according to claim 11,
wherein the similar ceramic materials comprise the material systems C/C, SiC/SiC, Al2O3/Al2O3, ZrO2/ZrO2 or mullite/mullite.

13. The method according to claim 1,
wherein the fiber and the base material are made of or comprise dissimilar ceramic materials.

14. The method according to claim 13,
wherein the dissimilar ceramic materials comprise the material systems C/SiC, or Al2O3/ZrO2.

15. The method according to claim 1,
wherein the powder bed is preheated to temperatures of above 1500° C. for the prevention of rupture and/or stresses, or is preheated to temperatures of above 1500° C. by a laser, or a CO2- or Nd:YAG-laser, an electron beam or inductive heating.

16. The method according to claim 1,
wherein the ceramic matrix composite is not structurally post-processed, or postprocessed by hot isostatic pressing and/or post-infiltration, after the layer-by-layer build-up.

* * * * *